United States Patent
Lee et al.

(10) Patent No.: US 9,239,480 B2
(45) Date of Patent: Jan. 19, 2016

(54) DISPLAY DEVICE

(71) Applicant: LG DISPLAY CO., LTD., Seoul (KR)

(72) Inventors: Gyu-Ho Lee, Seoul (KR); Sang-Yeol Kim, Seoul (KR); Gee-Sung Chae, Incheon-si (KR); Jung-Hee Kim, Seoul (KR); Eun-Behm Kim, Gyeonggi-do (KR); Won-Bong Jang, Seoul (KR); Nam Ki, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 176 days.

(21) Appl. No.: 13/674,240

(22) Filed: Nov. 12, 2012

(65) Prior Publication Data
US 2013/0286627 A1 Oct. 31, 2013

(30) Foreign Application Priority Data

Apr. 26, 2012 (KR) .................. 10-2012-0043878

(51) Int. Cl.
*G02F 1/1333* (2006.01)
(52) U.S. Cl.
CPC *G02F 1/133308* (2013.01); *G02F 2001/13332* (2013.01); *G02F 2001/133328* (2013.01)
(58) Field of Classification Search
CPC ............ G02F 1/133308; G02F 1/133608; G02F 2001/133317
USPC ............ 361/679.21; 349/58–60; 313/582; 455/575.8
See application file for complete search history.

(56) References Cited

U.S. PATENT DOCUMENTS

| | | | | |
|---|---|---|---|---|
| 3,703,431 A * | 11/1972 | Kemper | ........................ | 428/81 |
| 5,233,451 A * | 8/1993 | Iguchi | .......................... | 349/160 |
| 5,398,128 A * | 3/1995 | Tajima et al. | ................. | 349/150 |
| 5,729,310 A * | 3/1998 | Horiuchi et al. | ................ | 349/62 |
| 6,549,263 B1 * | 4/2003 | Kim | ................................. | 349/58 |
| 6,654,078 B1 * | 11/2003 | Kato et al. | ...................... | 349/58 |
| 6,897,912 B2 * | 5/2005 | Kawakami et al. | ............. | 349/61 |
| 6,917,395 B2 * | 7/2005 | Lee | ................................. | 349/58 |
| 6,967,701 B1 * | 11/2005 | Kim | ................................. | 349/122 |
| 6,996,425 B2 * | 2/2006 | Watanabe | ................... | 455/575.1 |
| 7,113,237 B2 * | 9/2006 | Nitto et al. | ...................... | 349/58 |
| 7,206,618 B2 * | 4/2007 | Latto et al. | ................. | 455/575.8 |

(Continued)

FOREIGN PATENT DOCUMENTS

CN 101174054 A 5/2008
JP 2006-309132 A 9/2006

(Continued)

OTHER PUBLICATIONS

Communication dated Feb. 13, 2013 from the European Patent Office in counterpart European Application No. 12190967.5-1904.

(Continued)

*Primary Examiner* — Adrian S Wilson
(74) *Attorney, Agent, or Firm* — Morgan, Lewis & Bockius LLP

(57) ABSTRACT

A display device includes a display panel having a display area and a bezel area formed around edges of the display area; a backlight unit disposed on a rear side of the display panel to provide light to the display panel; a supporting member to support the display panel and the backlight unit; and a top case having at least one joint and incorporated with a surface of the supporting member, wherein the top case has a main frame combined with the supporting member and a sub frame disposed on the bezel area and combined with the main frame.

15 Claims, 4 Drawing Sheets

(56) References Cited

U.S. PATENT DOCUMENTS

| | | | |
|---|---|---|---|
| 7,209,195 B2* | 4/2007 | Lin | 349/58 |
| 7,218,521 B2* | 5/2007 | Kim | 361/704 |
| 7,324,172 B2* | 1/2008 | Yamazaki | 349/58 |
| 7,456,793 B2* | 11/2008 | Napoles et al. | 343/702 |
| 7,710,519 B2* | 5/2010 | Okuda | 349/110 |
| 7,883,252 B2* | 2/2011 | Matsui et al. | 362/612 |
| 8,000,088 B2* | 8/2011 | Zhou et al. | 361/679.01 |
| 8,111,505 B2* | 2/2012 | Raff et al. | 361/679.02 |
| 8,663,764 B2* | 3/2014 | Luo et al. | 428/35.8 |
| 8,681,485 B2* | 3/2014 | Du et al. | 361/679.02 |
| 9,008,738 B1* | 4/2015 | Dong | 455/575.8 |
| 2001/0010569 A1* | 8/2001 | Jin et al. | 349/58 |
| 2003/0043310 A1* | 3/2003 | Cho | 349/58 |
| 2003/0133070 A1* | 7/2003 | Nam et al. | 349/158 |
| 2003/0218700 A1* | 11/2003 | Tsukamoto | 349/58 |
| 2006/0055839 A1* | 3/2006 | Hirao et al. | 349/58 |
| 2006/0139271 A1* | 6/2006 | Okuda | 345/88 |
| 2006/0238446 A1* | 10/2006 | Takahashi et al. | 345/55 |
| 2006/0257624 A1 | 11/2006 | Naritomi et al. | |
| 2007/0008449 A1* | 1/2007 | Choi | 349/58 |
| 2008/0100768 A1 | 5/2008 | Yang et al. | |
| 2008/0158468 A1* | 7/2008 | Kim et al. | 349/58 |
| 2009/0017242 A1* | 1/2009 | Weber et al. | 428/35.7 |
| 2009/0069061 A1* | 3/2009 | Laurent et al. | 455/575.7 |
| 2009/0111543 A1* | 4/2009 | Tai et al. | 455/575.8 |
| 2009/0122475 A1* | 5/2009 | Kim | 361/679.21 |
| 2009/0153768 A1 | 6/2009 | Ooami | |
| 2009/0274889 A1 | 11/2009 | Iwahashi et al. | |
| 2009/0325657 A1* | 12/2009 | Ramsdell et al. | 455/575.8 |
| 2010/0026656 A1* | 2/2010 | Hotelling et al. | 345/174 |
| 2010/0045888 A1 | 2/2010 | Naritomi | |
| 2011/0049139 A1 | 3/2011 | Jiang et al. | |
| 2011/0075342 A1* | 3/2011 | Gotham et al. | 361/679.21 |
| 2011/0089792 A1* | 4/2011 | Casebolt et al. | 312/223.2 |
| 2011/0090630 A1* | 4/2011 | Bergeron et al. | 361/679.26 |
| 2011/0227810 A1* | 9/2011 | Mckinney et al. | 345/1.3 |
| 2011/0236643 A1 | 9/2011 | Tsubouchi et al. | |
| 2013/0075941 A1* | 3/2013 | Chang et al. | 264/1.7 |
| 2013/0188366 A1* | 7/2013 | Russell-Clarke et al. | 362/362 |
| 2013/0281169 A1* | 10/2013 | Coverstone et al. | 455/575.8 |
| 2013/0286624 A1* | 10/2013 | Lee et al. | 361/807 |
| 2014/0204281 A1* | 7/2014 | Maeda | 348/794 |

FOREIGN PATENT DOCUMENTS

| | | |
|---|---|---|
| JP | 2008-116903 A | 5/2008 |
| JP | 2009-145824 A | 7/2009 |
| KR | 10-0827916 B | 5/2008 |
| KR | 10-2010-0063152 A | 6/2010 |
| KR | 10-0962884 B | 6/2010 |
| KR | 10-2011-0014487 A | 2/2011 |
| KR | 10-1048695 B | 7/2011 |
| TW | 200951546 A | 12/2009 |
| WO | 2010/061761 A1 | 3/2010 |
| WO | 2011/123790 A1 | 10/2011 |

OTHER PUBLICATIONS

Office Action dated dated Jan. 21, 2014 from the Japanese Patent Office in counterpart Japanese Application No. 2012-245369.
Office Action dated Jun. 7, 2013, from the Korean Intellectual Property Office in counterpart Korean Application No. 10-2012-0043878.
Office Action dated dated Aug. 20, 2014 from the Taiwan Intellectual Property Office in counterpart Taiwanese Application No. 101149206.
The First Office Action dated Apr. 29, 2015, from The State Intellectual Property Office of the People's Republic of China in counterpart Chinese Application No. 201210470759.7.

* cited by examiner

DISPLAY DEVICE

The invention claims the benefit of Korean Patent Application No. 10-2012-0043878 filed in Korea on Apr. 26, 2012, which is hereby incorporated by reference for all purposes as if fully set forth herein.

BACKGROUND OF THE INVENTION

1. Field of the Invention

The invention relates to a display device, and more particularly, to a display device including a case top with a main frame and a sub frame.

2. Discussion of the Related Art

Display devices encompass all devices for displaying images of display signals from outside, and include monitors receiving signals from personal computers and televisions receiving signals from broadcast stations. The display devices have been developed from cathode ray tubes (CRT) utilizing electrons emitted from the cathode in the vacuum to liquid crystal displays (LCD) utilizing variation of transmission degree of crystals according to the applied voltages, Plasma Display Panels (PDP) utilizing plasma phenomena, and so on. Display devices, such as LCDs and PDPs, have succeeded in accomplishing smaller thicknesses as compared to CRTs. By reducing weight and volume of displays, device size may be reduced. In addition, research and development continues for enhancing response speed and display quality.

In recent years, with effort to technical aspects of the display, technical research for design is desired to attract customers and becomes one of main concerns. In this aspect, a bezel area between edges of the display panel to the active area for display is determinative.

Various methods have been suggested to reduce the bezel area and improve its design quality. But it is not so easy to design the device with reduced bezel area while having enough strength for the display panel.

FIG. 1 is a cross-sectional view illustrating a liquid crystal display (LCD) device according to the related art.

In FIG. 1, the display device 1 has a backlight unit 30 and a liquid crystal display panel 22. The backlight unit 30 and the liquid crystal display panel 22 are secured by a main support 41, a top case 10, and a bottom cover 42. The top case 10 is a single unit, and is a reversed L-shaped to cover the top surface and the side edges of the display device. The top case 10 defines a rectangular opening portion for displaying images of the display panel 22 and is fixed to the main support 41 or the bottom cover 42. To form the opening portion, it is required to cut a bigger sized metal plate, which increases material cost. Further, since the top case 10 has narrow width, it is not sufficient to reinforce the display device 1.

To solve the above problem, Korean Patent No. 10-1048695 discloses a top case having a plurality of parts, one of which is hooked to the bottom through a hole. To mount the parts of the top case, an additional connection is needed on the top case and the bottom cover side. To strengthen the top case, similar to the related art top case, the top case must be elongated in the bezel area of the display panel.

SUMMARY OF THE INVENTION

Accordingly, the present invention is directed to a display device that substantially obviates one or more of the problems due to limitations and disadvantages of the related art.

An object of the present invention is to provide a display device that can support a display panel sufficiently and has no bezel area substantially.

Another object of the present invention is to provide a display device including separated top cases that are firmly fixed and can protect the display panel with high strength.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a display area displaying images, a display panel having a bezel area having a pattern along edges of the display area, a backlight unit providing light to the display panel, a supporting member combined with a surface of the supporting member to support the display panel and the backlight unit, and a top case combined to one surface of the supporting member and having at least one joint, wherein the case top has a main frame fixed to the supporting member, and a sub frame positioned on the bezel area and combined to the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the present invention, examples of which are illustrated in the accompanying drawings. Same numerals represent substantially same element throughout this specification. Concrete explanation of well known structure is omitted for avoiding unnecessary misunderstanding of this invention.

Figure 1:
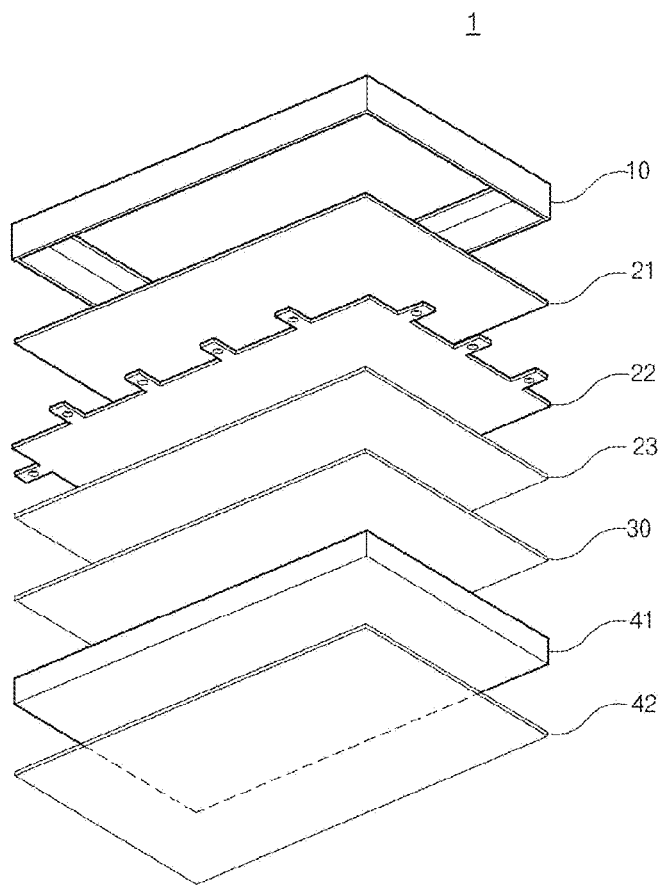
FIG. 1 is an exploded perspective view of illustrating a display device according to the related art.
Figure 2:
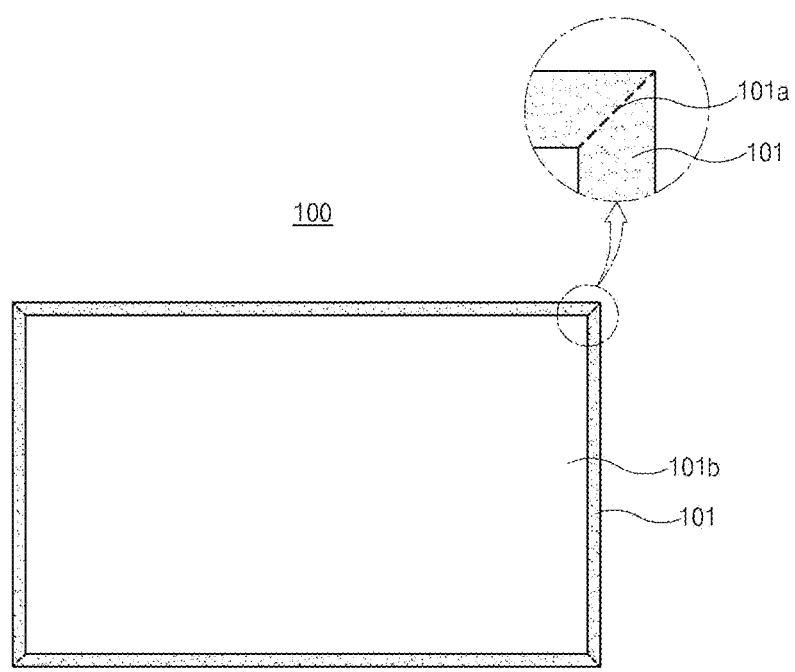
FIG. 2 is a top view of a top case of a display device according to an example of a first embodiment of the present invention.

FIG. 2 is a top view of a top case of a display device according to an example of a first embodiment.

As shown in FIG. 2, a top case 100 is made by connecting each metal plate which is separated from each other along the outlines of the top surface of the display device. Therefore, through the opening area 101b of the front surface of the top case 100, the image is displayed.

Here, the top case 100 has at least one joint portion 101a caused by separated metal plates, the joint portion 101a is firmly combined on the top surfaces of the metal plates by thermoplastic resin using an injection mold method, which completes one top case 100.

Therefore, it is possible to lower process cost by reducing the wasted metal plates which occur during making the top case with one metal plate. Also, it is possible to prevent foreign substances from entering through the joint portion 101a of the separated metal plates.

Figure 3:
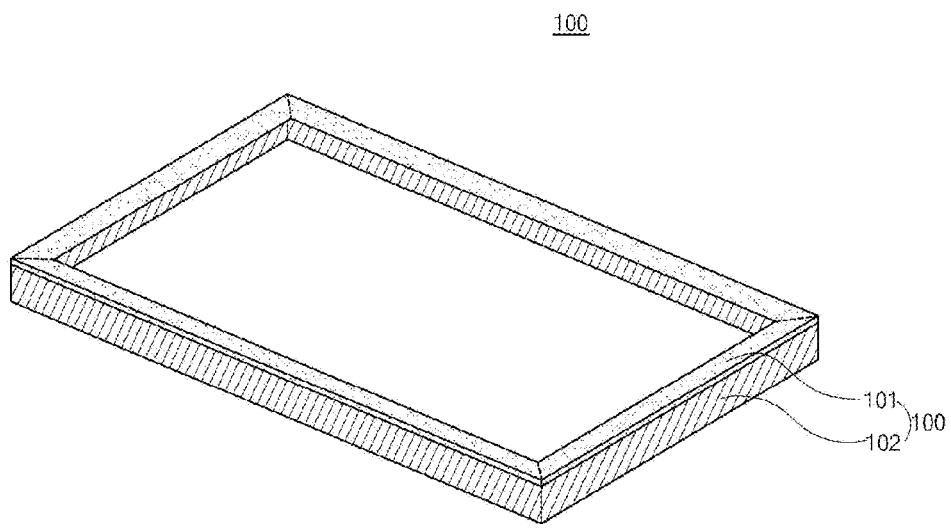
FIG. 3 is a schematic perspective view of the top case of FIG. 2.
Figure 4:
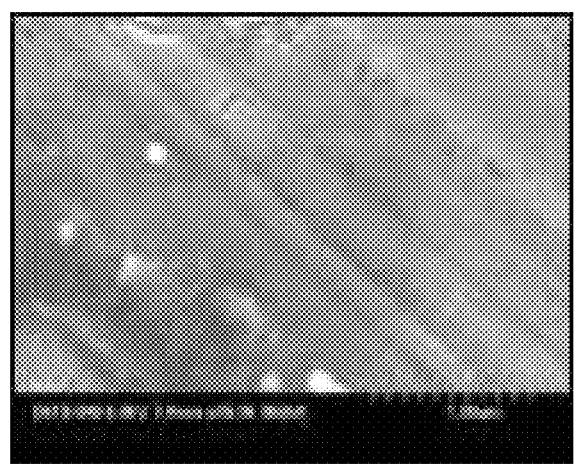
FIG. 4 is a photomicrograph of a main frame of the display device before surface treatment according to the first embodiment.

FIG. 3 is a schematic perspective view of the top case of FIG. 2. FIG. 4 is a photomicrograph of a surface of the main frame 102 of the display device before surface treatment according to the first embodiment, and FIG. 5 is a photomicrograph of a surface of the main frame 102 of the display device after surface treatment according to the first embodiment.

As shown in FIG. 3, the top case 100 is configured to cover the outlines of top and side surfaces of the display device. Here, the sub frame 101, which covers the outlines of the top surface of the display device has one color and is made of thermoplastic resin. The main frame 102 is made of metal and preferably has patterned design on its surface at the interface with the sub frame 101 rather than a flat smooth surface, as will be discussed further with reference to FIGS. 5 and 6 below.

The sub frame 101 and the main frame 102 are combined by the following processes.

Figure 5:
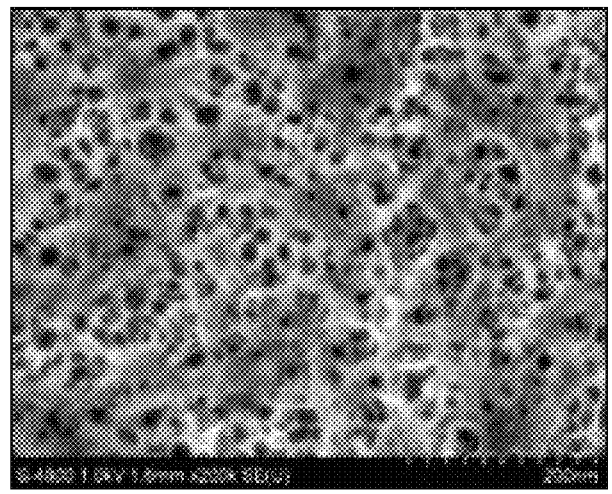
FIG. 5 is a photomicrograph of a main frame of the display device after surface treatment according to the first embodiment.

As shown in FIG. 5, the surface of the main frame 102 has minute uneven designs. The minute uneven designs are formed by a surface treatment process of the main frame 102.

The surface treatment process includes first and second pretreatment steps. The first pretreatment step uses alkaline aqueous solution of 0.1 to 10% concentration, which may include alkali metal hydroxide such as sodium hydroxide, potassium hydroxide and/or anhydrous sodium carbonate or ammonia. The second pretreatment step uses acid aqueous solution of 0 to 1% concentration, which may include acetic acid or hydrofluoric acid.

Instead of the first and second pretreatment steps, another pretreatment step can be adopted, where aqueous solution of reducing agents of 1 to 5% concentration is applied for several minutes. The reducing agents may include alkali metal sulfite, alkali metal bisulphate, hydrazine ($N_2H_4$), sodium boron hydride ($NaBH_4$), lithium aluminum hydride ($LiAlH_4$), and so on.

After the pretreatment steps, the main frame 102 is treated by an aqueous solution selected at least one from ammonia ($NH_3$), hydrazine ($N_2H_4$), pyridine ($C_5H_5N$), hydrazine derivative, and aqueous amino compounds, which may be called a T-treatment step. The solution is of 2 to 30% concentration. The treatment can be done with a gas absorption method, or they can be immersed in the solution, or the solution can be sprayed to them. Subsequently, a cleaning and drying step is performed.

Although a surface treatment process is illustrated as explained above, other methods for forming an uneven pattern or design can be adopted.

In succession, the thermo-plastic resin having at least one color is incorporated with the metal material, and the pattern of metal material is shown on the surface of the thermoplastic resin. Thus, the thermoplastic resin layer has a design. That is, by letting the pattern of the main frame 102 to be seen on the sub frame 101, the bezel area 200b of the display panel can have an improved sense of beauty or aesthetic.

The thermo-plastic resin may be polymethyl methacrylate (PMMA), polystyrene (PS), polyester (PE), Acrylonitrile-Butadiene-Styrene (ABS), polyphenylene sulfide (PPS), polyethylene terephthalate (PET), polybuthlene terephthalate (PBT), and so on, which have good transparence characteristics. An additive can be added considering mechanical strength, thermal resistance, adhesion, electric characteristic, etc.

For example, the inorganic filler can be glass fiber, carbon fiber, or metal fiber and the organic filler can be fluoride resin or acrylic resin. The additive may be flame retardant, coloring, antioxidant, parting agent, lubricant, or crystal accelerator, and so on according to the required performance.

The top case 100 is completed using four metal plates, but other numbers of the metal plates may be used. That is, this can be applied to top case of various structures, such as the metal plate having at least one joint portion.

Figure 6:
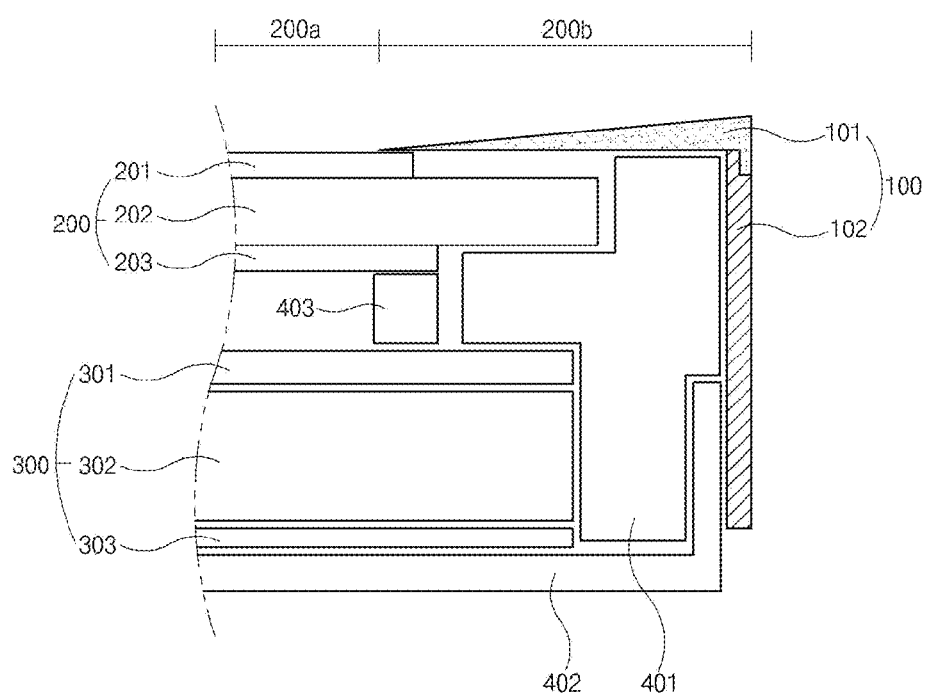
FIG. 6 is a cross-sectional view of the display device having the top case according to the first embodiment.

FIG. 6 is a cross-sectional view of the display device having the top case according to the first embodiment of the present invention. As shown in FIG. 6, the display device has a display area 200a for displaying images, a display panel 200 having a bezel area 200b along the edges of the display area, a backlight unit 300 for supplying light to the display panel 200, supporting members 401 and 402 for supporting the display panel 200 and the backlight unit 300, and the top case 100 combined with the supporting members. The top case 100 has the main frame 102 combined with the supporting members, and the sub frame 101 combined with the main frame 102 and positioned on the bezel area 200b.

The display panel 200 has upper and lower polarizers 201 and 203. The lower polarizer 203 selectively transmit linearly polarized light from the backlight unit 300 to a panel 202 and the upper polarizer 201 selectively transmit linearly polarized light from the display panel 202 to the outside.

The supporting members include a main support 401 and a bottom cover 402. The main support 401 surrounds and supports a side portion of the display panel 200 and the backlight unit 300. The bottom cover 402 covers a bottom portion and a side portion of the main support 401. The top case 100 surrounds the main support 401 and the bottom cover 402. The main support 401 can be formed by an injection molding method and may have stepped portions. The backlight unit 300 can be positioned on the lowest stepped portion. The display panel 200 is positioned on the backlight unit 300.

The top case 100 has the sub frame 101 and the main frame 102. As shown in FIG. 6, the top case 100 can surround the top portion and the side portion of the main support 401. In order to surround the side portion of the display device, the main frame 102 can be straight-bar shaped or reversed L shaped.

The sub frame 101 surrounds the upper edge of the display device and disposed on the bezel area 200b. The sub frame 101 is combined with a surface of the main frame 102. Here, the thickness of the sub frame 101 increases in the direction of edges of the display panel to have users concentrate on the display area 200a. The cross section of the sub frame 101 may have a triangular or bent configuration. The interface between the sub frame 101 and the main frame 102 has a patterned shape, as discussed above, thereby improving bonding between the sub frame 101 and the main frame 102 which enhances the protective strength of the top case 100 having at least one joint. Here, the patterned shape has one step, but other shapes may be used, such as multiple steps.

By using a thermoplastic resin having good transparent characteristics, the images from the display panel 200 can be seen even on the bezel area 200b, so that a non-active area or bezel area does not exist substantially.

The backlight unit 300 has a lamp housing (not shown) including a light source (not shown), a light guide plate 302 for transferring light from the light source to surface light, optical sheets 301 for increasing the efficiency of the light towards the display panel 200, a reflector 303 for reflecting the light from the light guide plate 302 towards the display panel 200. The optical sheets 303 are attached to the light guide plate 302 and the reflector 303 is attached to the bottom surface of the light guide plate 302.

The light guide plate 302 provides uniform light distribution to the entire display device from the light source. The optical sheets 302 include diffusion sheets and prism sheets. The optical sheets 302 may diffuse or collimate the light passing through the light guide plate 302 to improve uniformity and brightness of the planar light thereby enlarging the viewing angle.

In FIG. 6, though a pad 403 is disposed near the main support 401, the position can be changed. For example, it can be positioned on the sides of the top case 100 or bottom cover 402. The pad 403 may be a silicon pad for releasing pressure or impact. The pad 403 may also protect against dust.

As described, using the thermoplastic resin with good transparent characteristics as the sub frame 101 covering the top edges of the display panel 200, the display panel 200 can be stably supported and no bezel area 200b is needed. Thus, users can concentrate on the images displayed.

In addition, using the separated top case with no additional cutting steps, the joint can be firmly fixed, the display panel can provide high strength protection, and foreign matter can be prevented from entering the display panel.

It will be apparent to those skilled in the art that various modifications and variations can be made in the present invention without departing from the spirit or scope of the invention. Thus, it is intended that the present invention cover the modifications and variations of this invention provided that they come within the scope of the appended claims and their equivalents.

What is claimed is:

1. A display device, comprising:
   a display panel having a display area and a bezel area formed around edges of the display area;
   a backlight unit disposed on a rear side of the display panel to provide light to the display panel;
   a supporting member to support the display panel and the backlight unit; and
   a top case having at least one joint and incorporated with a surface of the supporting member,
   wherein the top case has a main frame combined with the supporting member, and a sub frame disposed on the bezel area and combined with the main frame;
   wherein the sub frame includes a transparent thermoplastic resin;
   wherein the main frame is disposed on a side surface of the supporting member and exposes a top surface of the supporting member;
   wherein the sub frame covers the top surface of the supporting member exposed by the main frame;
   wherein the main frame includes a metal having a pattern on at least a surface thereof at an interface between the main frame and the sub frame;
   wherein the pattern includes minute uneven designs formed by a chemical treatment process; and
   wherein the main frame of the metal and the sub frame of the transparent thermoplastic resin are perpendicularly combined with each other so that the sub frame of the transparent thermoplastic resin is exposed toward a front direction of the display device.

2. The device according to claim 1, wherein the sub frame is bonded to the main frame by an injection molded thermoplastic resin.

3. The device according to claim 1, wherein the supporting member includes a bottom cover to accommodate the display panel and the backlight unit, and a main support to fix positions of the display panel and the backlight unit.

4. The device according to claim 1, further comprising a pad disposed between the backlight and the display panel to absorb impact and to protect the display panel from dust.

5. The display device according to claim 1, wherein the main frame of the top case includes a plurality of metal plates connected to each other at the at least one joint to surround the display panel and the supporting member.

6. The display device according to claim 5, wherein the metal plates are firmly combined by the sub frame formed of a thermoplastic resin disposed on top surfaces of the metal plates.

7. The display device according to claim 5, wherein the connected metal plates define an opening with the display panel disposed in the opening.

8. The display device according to claim 1, wherein the sub frame covers outline portions of a top surface of the display panel.

9. The display device according to claim 1, wherein the sub frame has a cross section with one of a triangular shape or a bent configuration.

10. The display device according to claim 1, wherein the main frame includes a metal.

11. The display device according to claim 1, wherein the main frame has at least one step on its surface at the interface with the sub frame.

12. The display device according to claim 1, wherein the sub frame has a cross section with a triangular shape.

13. The display device according to claim 1, wherein the transparent thermoplastic resin includes an inorganic filler comprising at least one of glass fiber, carbon fiber, and metal fiber.

14. The display device according to claim 1, wherein the main frame exposes a bottom surface of the supporting member.

15. The display device according to claim 1, wherein the supporting member includes a main support surrounding the display panel and the backlight unit and a bottom cover covering the main support,
   wherein the main frame is disposed on a side surface of the main support and exposes top and bottom surfaces of the main support,
   wherein the sub frame covers the top surface of the main support exposed by the main frame, and
   wherein the bottom frame covers the bottom surface of the main support exposed by the main frame.

* * * * *